(12) United States Patent
Ziegler et al.

(10) Patent No.: US 6,708,288 B1
(45) Date of Patent: Mar. 16, 2004

(54) COMPILER-BASED CHECKPOINTING FOR SUPPORT OF ERROR RECOVERY

(75) Inventors: Michael L. Ziegler, Campbell, CA (US); Lawrence D. K. B. Dwyer, So. San Fran., CA (US); Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 09/702,590

(22) Filed: Oct. 31, 2000

(51) Int. Cl.[7] ................................................ G06F 11/00
(52) U.S. Cl. .............................. 714/15; 714/38; 714/35; 717/146
(58) Field of Search .............................. 714/15, 17, 19, 714/35, 38; 717/146, 147, 148

(56) References Cited

U.S. PATENT DOCUMENTS

| | | | | |
|---|---|---|---|---|
| 5,293,629 A | * | 3/1994 | Conley et al. | ............... 717/154 |
| 5,987,249 A | * | 11/1999 | Grossman et al. | ........... 717/130 |
| 6,105,148 A | * | 8/2000 | Chung et al. | .................. 714/16 |
| 6,186,677 B1 | * | 2/2001 | Angel et al. | ................. 717/118 |
| 6,233,732 B1 | * | 5/2001 | Matsuyama et al. | ........ 717/141 |
| 6,463,579 B1 | * | 10/2002 | McKinsey | ................... 717/146 |

* cited by examiner

*Primary Examiner*—Robert Beausoliel
*Assistant Examiner*—Marc Duncan

(57) ABSTRACT

Compiler-based checkpointing for error recovery. In various embodiments, a compiler is adapted to identify checkpoints in program code. Sets of data objects are associated with the checkpoints, and checkpoint code is generated by the compiler for execution at the checkpoints. The checkpoint code stores state information of the associated data objects for recovery if execution of the program is interrupted.

13 Claims, 5 Drawing Sheets ns, for example, transaction processing
COMPILER-BASED CHECKPOINTING FOR SUPPORT OF ERROR RECOVERY

FIELD OF THE INVENTION

The present invention generally relates to recovery of execution of a computer program from hardware errors, and more particularly to compilation of program source code to support error recovery.

BACKGROUND

Checkpointing is a technique that is frequently used to recover a software application from a hardware failure. Checkpoints are established at selected points in the execution of the application. At each checkpoint, the state of selected data elements is saved along with a reference to the point in the program code at which the state was saved. In the event of a hardware failure, the most recent state of the checkpoint data can be restored and execution resumed at the point in the program following the checkpoint.

To provide checkpointing in a software application, the software developer is generally required to write the code that performs the checkpointing or make use of system-provided routines to perform the checkpointing. In either scenario, coding effort is required of the developer. For some applications, for example, transaction processing applications, it may be desirable for the developer to have close control over the checkpointing in the application. However, in other types of applications the developer may be less concerned with the exact points at which checkpoints are taken. Checkpointing code in the source file may also clutter the application code in applications where the developer is less concerned with checkpoint logic.

A system and method that address the aforementioned problems, as well as other related problems, are therefore desirable.

SUMMARY OF THE INVENTION

The present invention provides, in various embodiments, a compiler that identifies checkpoints in program code. Sets of data objects are associated with the checkpoints, and checkpoint code is generated by the compiler for execution at the checkpoints. The checkpoint code stores state information of the associated data objects for recovery if execution of the program is interrupted.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the present invention provides a method and apparatus for generating during the compilation of source code, object code that implements checkpoints. The compiler automatically generates the checkpoint object code without having checkpoints specified in the source code.

Figure 1:
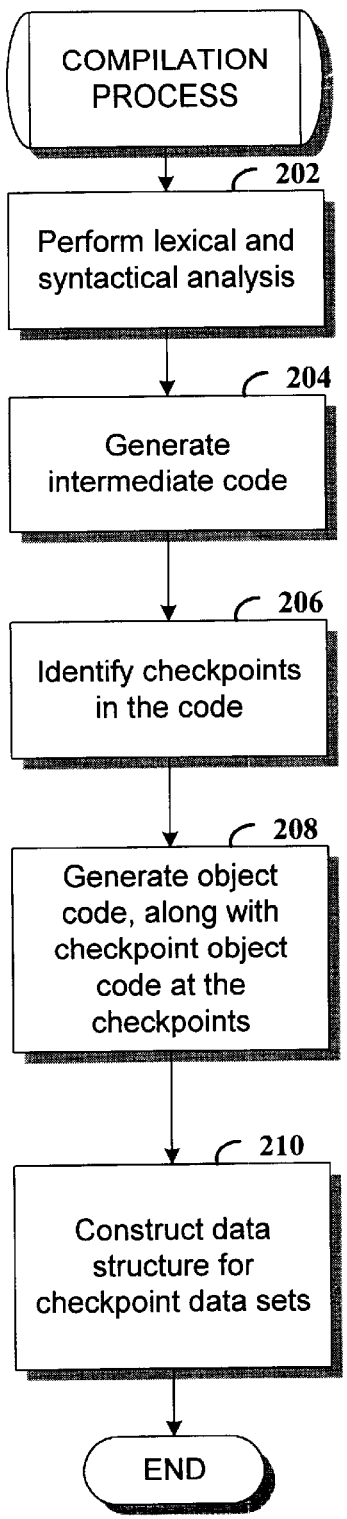
FIG. 1 is a flowchart of a process for compiling source code and generating object code that includes checkpoints in accordance with one embodiment of the invention.

FIG. 1 is a flowchart of a process for compiling source code and generating object code that includes checkpoints in accordance with one embodiment of the invention. The process generally entails identification of the points of program execution at which checkpoints are appropriate, and generating object code to implement the checkpoints. At steps 202 and 204, program source code is compiled using known compilation techniques. The flow includes performing lexical and syntactical analysis of the source code and generating intermediate code.

At step 206, the intermediate code is analyzed and suitable points for checkpoints are identified. In one embodiment, checkpoints are identified at procedure boundaries, for example. As used herein, "procedure" refers to units of program code that are callable from various points in a program. Procedures are also sometimes referred to as "functions" or "methods" in various programming languages.

As a practical matter, there are times when a checkpoint can no longer be used. These occurrences can be identified with cooperation from the operating system, for example, or with the compiler. An example where a checkpoint must be invalidated is where a write to external media occurs. The operating system may detect such a system call and invalidate the checkpoint. In and alternative embodiment, the compiler detects system calls and in a conservative mode of operation places a checkpoint immediately after the system call.

At step 208, the program object code is generated, along with the checkpoint object code at the checkpoints identified at step 206. Generally, the checkpoint object code saves the state of data objects to be recovered in the event of a hardware failure.

At step 210, a data structure is created to manage the data saved at each checkpoint in relation to the checkpoints in the program code. Since the checkpoints save the state of possibly different sets of data objects ("checkpoint data set"), each checkpoint has associated storage for state of the associated checkpoint data set.

Figure 2A:
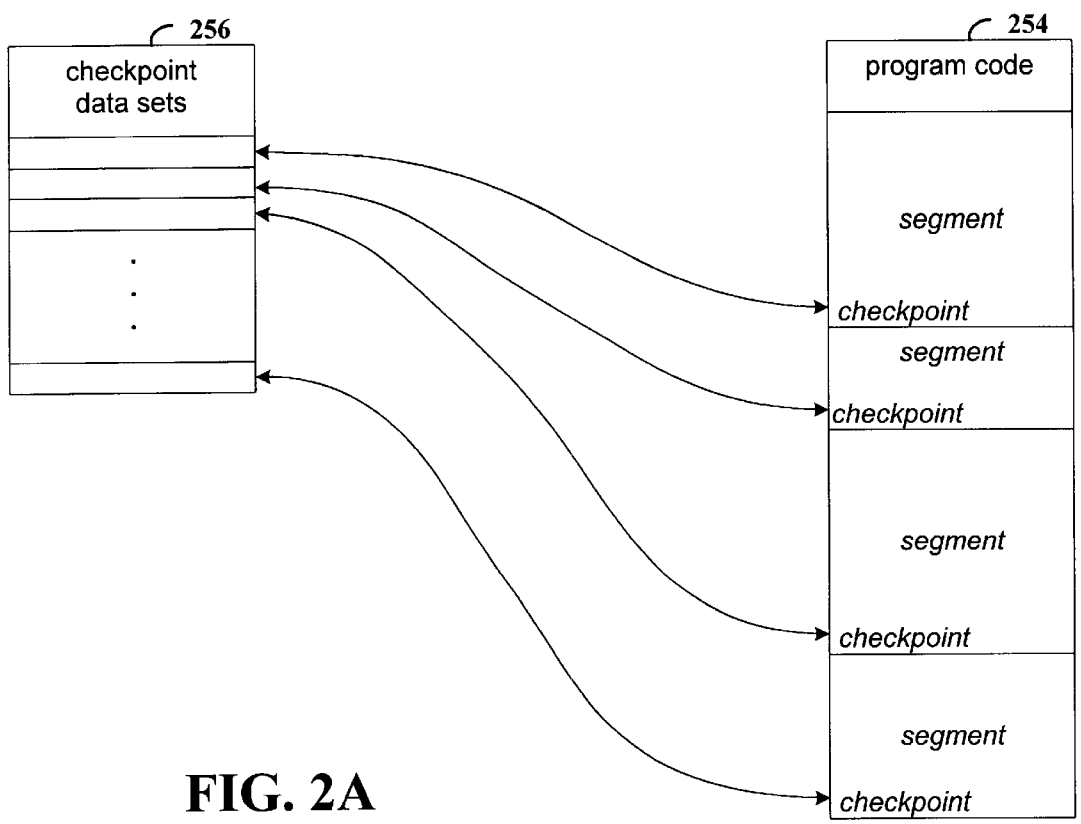
FIG. 2A is a block diagram that illustrates an example data structure used in the management of checkpoints.

FIG. 2A is a block diagram that illustrates an example data structure used in the management of checkpoints. Checkpoints in program object code 254 reference respective entries in the checkpoint data sets table 256. Each checkpoint also delineates a unit of execution, or "segment", in the program object code.

Each checkpoint data set includes storage for the state of the data objects that are recorded at the associated checkpoint. It will be appreciated that for recovery purposes each of checkpoint data sets 256 may also include references (not shown) to the data objects that are associated with the state data.

At each of the checkpoints, the state of the selected data objects is stored in the referenced location of checkpoint data sets 256. In addition, each checkpoint timestamps the set of checkpoint data when storage of the state information is complete. The timestamp allows the recovery process to identify the last completed checkpoint.

If execution of program 254 is interrupted, for example, by a hardware failure, execution can be recovered using one of checkpoint data sets 256. Using the timestamps of the data sets, the most recent checkpoint data set can be identified and the state restored to the data objects at the associated checkpoint. Each checkpoint data set is associated with a program address so that the program can be restarted at the address following the checkpoint.

The selected storage media for checkpoint data sets 256 depends on the needs of the application and the computer system on which the program executes. For example, in applications where recoverability is critical such as a banking transaction application, the selected media may be a magnetic disk. If the computer system has redundant electronic memories, however, the checkpoint data sets may be stored therein for applications that are less critical. When the checkpoint data sets are stored in memory and the system includes multiple processors, the program can be recovered using an alternative processor if the processor on which program is executing fails.

Figure 2B:
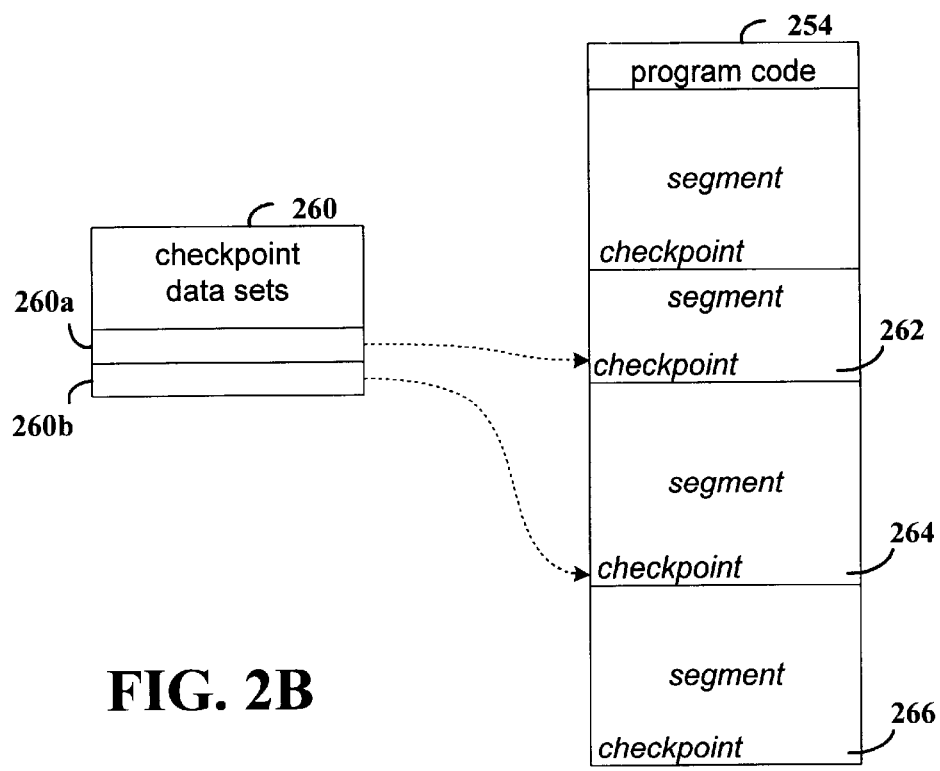
FIG. 2B is a block diagram that illustrates an example data structure used in the management of checkpoints in accordance with another embodiment of the invention.

FIG. 2B is a block diagram that illustrates an example data structure used in the management of checkpoints in accordance with another embodiment of the invention. To save storage space, two checkpoint data sets 260a and 260b are maintained rather than dedicated checkpoint data sets for the checkpoints as illustrated in FIG. 2A.

Checkpoint data are alternately stored in checkpoint data sets 260a and 260b for consecutive checkpoints. For example, at time t1, checkpoint data set 260a references checkpoint 262 and checkpoint data set 260b references checkpoint 264. At time t2 after program execution completes checkpoint 266, checkpoint data set 260a references checkpoint 266, and checkpoint data set 260b references checkpoint 264.

Timestamps or commit flags may be used in alternative embodiments to indicate which of the checkpoint data sets is to be used in recovery. The timestamp scheme involves writing a timestamp to a checkpoint data set when the storage of state information in the checkpoint data set is complete. Thus, the later of the two timestamps indicates which of checkpoint data sets 260a or 260b is to be used in recovery. The commit flag scheme involves a flag that indicates which of checkpoint data sets 260a or 206b is to be used in recovery.

In some scenarios it may be desirable to roll back to a checkpoint that predates the most recent checkpoint. For example, for a software fault that is timing dependent, the fault may have occurred at a point prior to the most recent checkpoint. Thus, recovering the program at a checkpoint that predates the most recent checkpoint by a selected number of checkpoints may avoid the timing error. The arrangement of FIG. 2B supports rolling back one checkpoint prior to the most recent checkpoint, while the arrangement of FIG. 2A supports multiple stages of rollback.

There are, however, practical limits on the number of stages of rollback. For example, once the program commits a record to disk (as an output of the program rather than just as data that the program alone is manipulating), that action eliminates the possibility of rolling back to a point at which such an action is not certain to occur.

Suppose, for example, that between checkpoint time n and checkpoint time n+1 the program determines that it is appropriate that a certain data base record be updated. Deferring the update itself until after the checkpoint at time n+1 allows a subsequent rollback to time n+1, but not to time n. In other words, a rollback is allowed to the state at time n at any point prior to time n+1 because the update will not yet have been made.

A rollback of more than one stage cannot be made after time n+1 because resuming execution from the checkpoint state preserved at time n could lead to a different determination as to whether the record should have been updated (even though the record has already been updated), where resuming execution from the state preserved at time n+1 could only cause the update of the record to be repeated (with no harm done), but could not cause the decision to update to be reversed.

If it is desirable to preserve the ability to rollback two stages in this example situation, the update that was determined to be necessary between time n and time n+1 would have to be delayed until after the checkpoint at time n+2. However, depending on the frequency of checkpoints, such additional deferrals may have an undesirable performance impact. This example could also be applied to other persistent or externally visible actions such as communicating over a network.

Thus, it may be desirable to include more than two checkpoint data sets but fewer checkpoint data sets than the number of checkpoints in the program.

Figure 2C:
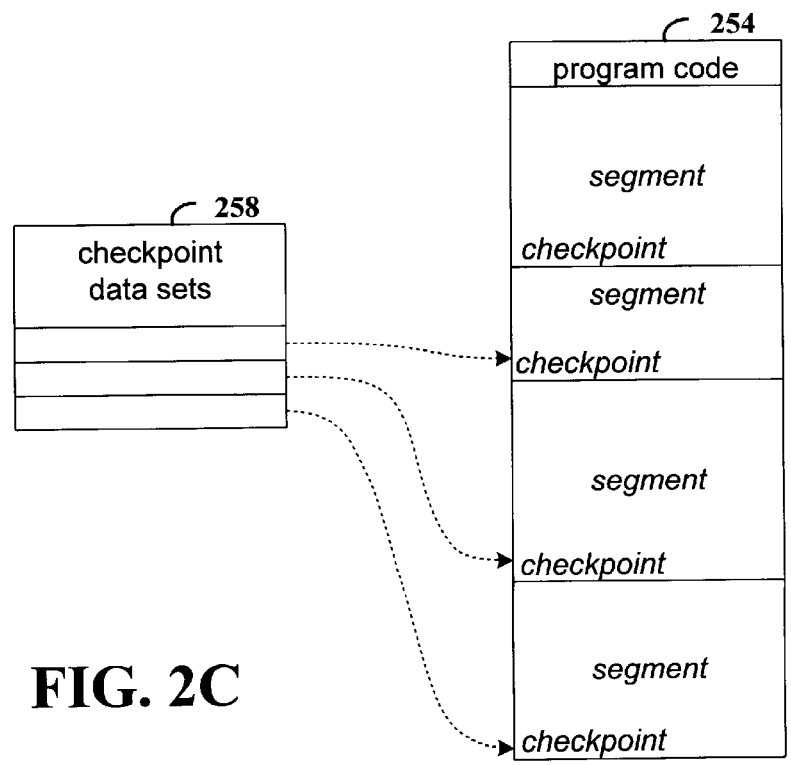
FIG. 2C is a block diagram that illustrates an example data structure used in the management of checkpoints that permits recovery by multiple stages of checkpoints.

FIG. 2C is a block diagram that illustrates an example data structure used in the management of checkpoints that permits recovery by multiple stages of checkpoints. Each of checkpoint data sets references the checkpoint in the program code 254 with which the data set is associated. When a checkpoint is encountered in executing the program code, the oldest of the checkpoint data sets 258 is used to store the new checkpoint data, and the reference to the checkpoint in the program code is updated. The arrangement of FIG. 2C substantially reduces the amount of storage required for the checkpoint data sets as compared to the arrangement of FIG. 2A, but provides an additional stage for roll back from an error as compared to the arrangement of FIG. 2B. It will be appreciated that more than three checkpoint data sets could be implemented if desired.

Figure 3:
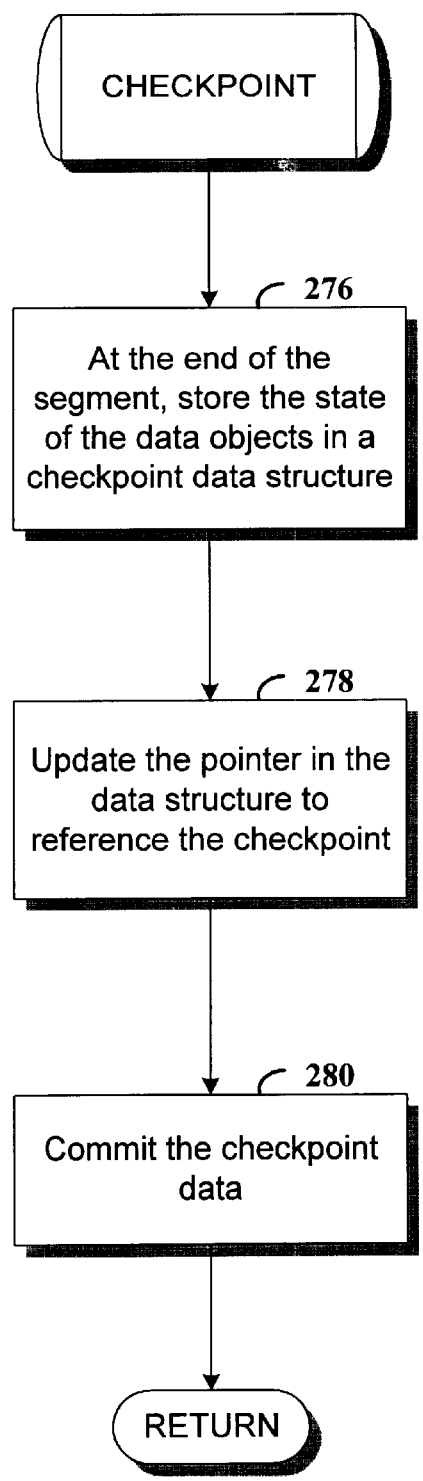
FIG. 3 is a flowchart of a process implemented by the checkpoint object code in accordance with one embodiment of the invention.

FIG. 3 is a flowchart of a process implemented by the checkpoint object code in accordance with one embodiment of the invention. The process generally entails waiting until the end of a segment of code to store the state of the data objects associated with the checkpoint. Saving the state all at once at the end of a segment introduces less overhead than storing the state of individual data objects when the segment is executing since saving the state involves writing to memory as opposed to writing to cache memory or to a register.

At step 276, the state of the data objects after the segment has been executed is stored in a checkpoint data structure. The pointer to the checkpoint in the program code is then updated at step 278. When storage of the state and checkpoint reference is complete, the checkpoint data set is acceptable for recovering the program. At step 280, the checkpoint data set is committed. As described above, timestamps or a commit flag may be used to indicate that a checkpoint data set is valid for use in recovery.

In another embodiment, hardware assistance is provided for checkpointing. With hardware-assisted checkpointing, modifications to data objects in memory between checkpoints are queued and updated only at a commit point, thereby minimizing the overhead associated with checkpointing. In this embodiment, the compiler need only account for data in registers. However, the hardware-assisted approach would make difficult rolling back multiple stages.

Figure 4:
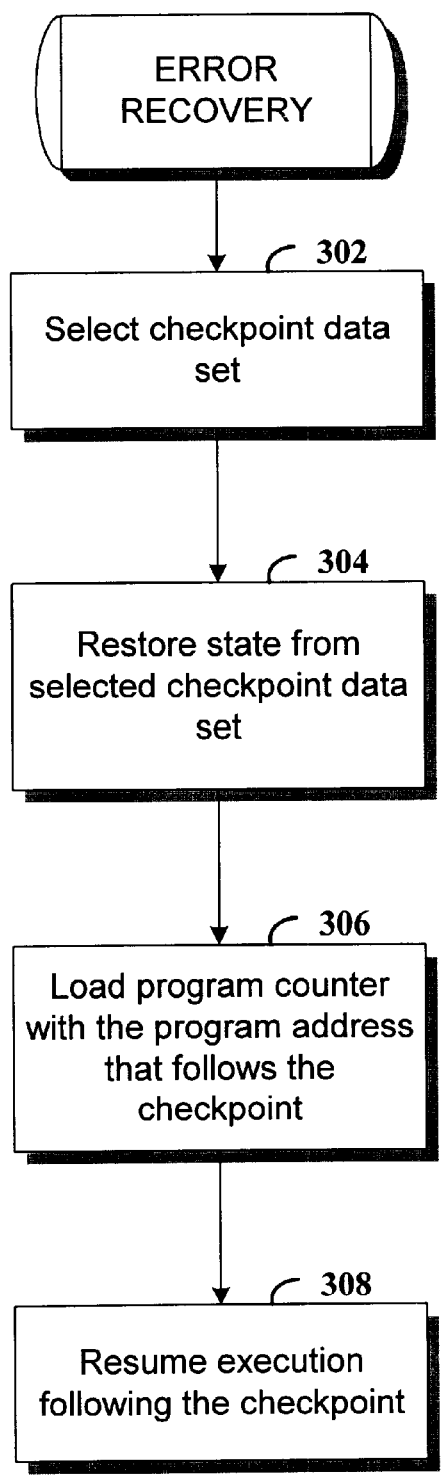
FIG. 4 is a flowchart of a process for recovering from an error using the checkpoint data of the present invention.

FIG. 4 is a flowchart of a process for recovering from an error using the checkpoint data of the present invention. The process generally entails identifying the checkpoint at which the program is to be recovered, recovering the checkpoint data set, and continuing execution of the program following the selected checkpoint.

At step 302, a checkpoint data set is selected based on the timestamps of the data sets. In one embodiment, the checkpoint data set having the most recent timestamp is selected for recovery. In another embodiment, it may be desirable to roll back to a checkpoint that predates the most recent checkpoint. For example, for a software fault that is timing dependent, the fault may have occurred at a point prior to the most recent checkpoint. Thus, recovering the program a selected number of checkpoints that predate the most recent checkpoint may avoid the timing error.

At step 304, the selected checkpoint data set is restored to the program data objects. The program address that follows the selected checkpoint is loaded in the program counter at step 306. Execution of the program then resumes, as shown by step 308.

The present invention is believed to be applicable to compilers for a variety of programming languages. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for error recovery, comprising:

compiling program source code into intermediate program code;

identifying checkpoints in the intermediate code independent of checkpoint control structures in the intermediate program code;

associating sets of data objects with the checkpoints; and automatically generating executable checkpoint code for execution at the checkpoints, the checkpoint code configured to store state information of the associated data objects for recovery if execution of the program is interrupted.

2. The method of claim 1, further comprising:

executing the program code;

storing the state information in executing the checkpoint code;

upon detecting an error in execution of the program code at a failure point,
selecting a checkpoint that is one or more checkpoints prior to the failure point;
restoring the state information of the data objects that are associated with the selected checkpoint; and
resuming execution at the selected checkpoint.

3. The method of claim 1, further comprising:

executing the program code; and in executing the checkpoint code, saving state information of the set data objects that is associated with the checkpoint.

4. The method of claim 1, wherein each checkpoint delineates a segment of program code and further comprising:

executing the program code; and in executing the checkpoint code, saving state information of the data objects associated with the checkpoint prior to executing the associated segment of program code, and saving state information of the data objects associated with the checkpoint after executing the associated segment of program code, and associating the saved state information of the data objects with the checkpoint.

5. The method of claim 4, further comprising:

upon detecting an error in execution of the program code,
restoring to the data objects associated with the checkpoint the saved state information of the data objects; and
resuming execution at the checkpoint associated with the saved state information.

6. The method of claim 1, further comprising:

constructing respective checkpoint data structures for the checkpoints in the program code; and establishing references between the checkpoint data structures and the associated checkpoints.

7. The method of claim 6, further comprising:

executing the program code;

storing in the checkpoint data structures the state information of the data objects that are associated with the checkpoints;

upon detecting an error in execution of the program code at a failure point,
selecting a checkpoint data structure;
restoring to the data objects the state information of the data objects that are associated with the selected checkpoint; and
resuming execution at the selected checkpoint.

8. The method of claim 1, further comprising:

constructing a selected number of checkpoint data structures;

executing the program code;

in executing the checkpoint code, selecting one of the checkpoint data structures, saving state information of the set data objects that is associated with the checkpoint in the selected checkpoint data structure, and associating the selected checkpoint data structure with the checkpoint.

9. The method of claim 8, further comprising:

executing the program code;

storing in the checkpoint data structures the state information of the data objects that are associated with the checkpoints;

upon detecting an error in execution of the program code at a failure point,
selecting a checkpoint data structure;
restoring to the data objects the state information of the data objects that are associated with the selected checkpoint; and
resuming execution at the selected checkpoint.

10. The method of claim 1, wherein checkpoints are identified where storage requirements of data objects are at a local minimum.

11. An apparatus for error recovery, comprising:

means for compiling program source code into intermediate program code;

means for identifying checkpoints in the intermediate code independent of checkpoint control structures in the intermediate program code;

means for associating sets of data objects with the checkpoints; and means for automatically generating executable checkpoint code for execution at the checkpoints, the checkpoint code configured to store state information of the associated data objects for recovery if execution of the program is interrupted.

12. The method of claim 11, further comprising:

means for executing the program code;

means for storing the state information at the checkpoints in executing the checkpoint code;

means for selecting a checkpoint that is one or more checkpoints prior to the failure point, upon detecting an error in execution of the program code at a failure point;

means for restoring the state information of the data objects that are associated with the selected checkpoint; and means for resuming execution at the selected checkpoint.

13. A computer program product configured for causing a computer to perform the steps comprising:

compiling program source code into intermediate program code;

identifying checkpoints in the intermediate code independent of checkpoint control structures in the intermediate program code;

associating sets of data objects with the checkpoints; and automatically generating executable checkpoint code for execution at the checkpoints, the checkpoint code configured to store state information of the associated data objects for recovery if execution of the program is interrupted.

* * * * *